United States Patent Office 3,240,821
Patented Mar. 15, 1966

3,240,821
PROCESS FOR THE PRODUCTION OF LINALOOL
Günther Ohloff, Erich Klein, and Gerhard Schade, Mulheim an der Ruhr, Germany, assignors to Studiengesellschaft Kohle m.b.H., Mulheim an der Ruhr, Germany, a corporation
No Drawing. Filed June 29, 1962, Ser. No. 206,506
Claims priority, application Germany, July 3, 1961, St 18,023
9 Claims. (Cl. 260—631.5)

The invention relates to the production of linalool, especially in optically active form.

The tertiary monoterpene alcohol linalool is contained in numerous ethereal oils. Its laevorotary form is obtained from the Chinese HO-oil ($\alpha_D - 18°$) or from the corresponding linaloe oil ($\alpha_D - 4°$). Dextrorotary Brazilian rose wood oil gives weakly optically active (+)-linalool ($\alpha_D + 6°$).

As a result of its considerable technical importance a considerable number of synthetic processes have been proposed for the production of linalool, all of which yield the racemate. Thus, according to W. Kimel, A. Ofner and coworkers (J. Org. Chem. 23, 1953 [1958]), the terpene alcohol is obtained by a multi-stage process, starting from acetone via the methyl heptenone. Another method used on an industrial scale proceeds by way of myrcene, which is obtainable by pyrolysis of nopinene and also leads to linalool as well as a number of other alcohols, by transformation of the acyclic terpene which already has the necessary carbon structure into the monohydrohalide and subjecting this under particular conditions to hydrolysis (U.S. Patent 2,794,826 or 2,882,323). The synthesis of the optical antipodes is unknown.

The present invention is concerned with a novel process for the production of linalool from pinan-2-ol by pyrolysis. Thus, it has surprisingly been found according to the invention that optically active linalool is obtained if the enantiomeric forms of pinane-2-ol or its diastereomers are pyrolysed. Advantageously optically active cis- or transpinane-2-ol is conducted at temperatures between 500 and 650° C., advantageously under reduced pressure, through a suitable pyrolysis oven. By operating discontinuously, there are formed from 50 to 90% of linalool, 5 to 40% of other pyroalcohols, 5 to 15% of hydrocarbons as well as varying amounts of unmodified starting material, depending upon the precise conditions used.

The thermal isomerisation of pinane-2-ol according to the invention can also be effected with advantage continuously by continuous distillation of the pyrolysis products of lower boiling point through a fractionating column connected to the pyrolysis oven, so that the unreacted bicyclic terpene alcohol returns to the reaction zone. In this way, it is possible by the process of the invention to prepare optically active linalool with a degree of purity up to about 93%, this crude product then being further purified in the usual maner if desired.

As regards the dimensions of the apparatus, the heat flux and flow of material in the contact zone must always be so matched to one another that the effective temperatures of the reaction material as required for the reaction remain in the range of 500 to 650°, which is important for best possible yields, and do not fall to temperatures favouring the production of undesirable secondary products. From the point of view of carrying out the process to obtain a maximum yield of the desired linalool, it has been found that the pyrolysis temperature and the residence time of the starting material undergoing pyrolysis are so mutually dependent on one another that maximum linalool yields are obtained at highest possible pyrolysis temperatures and comparably short residence times. The residence time of the reaction material can readily be regulated within wide limits in the usual manner by controlling the flow velocity of the material. To increase the flow velocity it has proved to be particularly desirable according to the invention to increase the flow velocity by operating under a vacuum of for example in the range of from 100 mm. Hg to 0.5 mm. Hg.

Another important factor in the process is the exclusion of protons or Lewis acids. Whereas when working in a quartz tube a 30 to 40% dehydration, with the formation of a hydrocarbon mixture of uncertain composition results and thus a substantial reduction in the total yield of linalool, the amount of water which is split off in a stainless steel tube can be kept below 10%. If in addition the process takes place in the presence of bases, if desired in solutions of pyridine or dimethyl aniline or in the presence of ammonia as inert gas, one can suppress also completely undesired isomerization, so that after a single passage through the system, a pyrolysate is obtained with a linalool content of up to 90%.

The actual composition of the product is determined to a large extent by the nature of the starting material. Thus, pure cis-pinane-2-ol decomposes almost quantitively into linalool 93% of the theoretical), whereas the transisomer undergos pyrolysis in this direction to a maximum extent of 75%. The other pyrolysis products of pinane-2-ol consist of a mixture of 2,4-dimethyl octadi-2,7-en-4-ol, 2,2-dimethyl-3-ethyl cyclobutylmethyl ketone as well as larger quantities of α-terpineol and 1,2-dimethyl - 3 - isopropenyl-cyclo-1-pentanol and smaller quantities of unknown compounds. The two latter alcohols are secondary products of the reaction and constitute thermal cyclisation products of linalool. The recation must be so conducted that further change of the resulting linalool is not possible. Formation of hydrocarbons from pinane-2-ol can likewise be almost completely suppressed by conducting the reaction under suitable conditions for example in the presence of bases. The composition of the secondary products from trans- and cis-pinane-2-ol is always the same.

Starting from (+)-cis-pinane-2-ol, the (—)-linalool is obtained, while the (+)-linalool is formed from the (—)-cis-pinane-2-ol or (+)-trans-pinane-2-ol. Mixtures of equal parts of (—)-trans- and (—)-cis-pinane-2-ol give inactive linalool. The racemates of the diastereomeric pinane-2-ols produce exclusively racemic linalool. The optical purity of the diastereomeric bicyclic terpene alcohol which is used as starting material is of major importance in determining the optical activity of the final product.

Linalool, especially in its optically active form, is a product which today is important and which plays an important part for example in the synthesis of perfumes or perfume mixtures.

For the further understanding of the invention valency isomerisation of the enantiomeric forms of diastereomeric pinane-2-ols according to the invention is shown in the reaction scheme

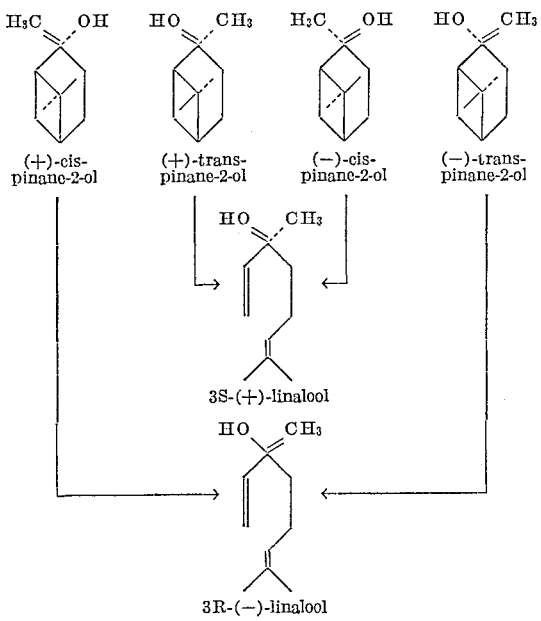

The following examples illustrate the invention.

*Example 1*

100 g. of (−)-cis-pinane-2-ol (M.P. 78°) were introduced through a heated dropping funnel (80°) into a two-necked flask with a capacity of 250 cc. and preheated to 200°, the said flask being provided with a capillary tube for the introduction of inert gas (nitrogen or argon). The spontaneously evaporating alcohol was conducted into a quartz tube with a length of 80 cm. and a diameter of 25 cm., this tube being half-filled with sintered filler bodies consisting of quartz and being heated to 570° by an electrical heating jacket having a length of 1 meter. The entire pyrolysis apparatus was under a vacuum of 2 mm. Hg. The pyrolysate was conducted through a distillation bridge, condensed in a condenser and collected in a receiver.

In this way, 95 g. of a reaction mixture were obtained, and when analysed by gas chromatography, the mixture consisted of 50% of linalool, 25% of hydrocarbons and 25% of other pyroalcohols, in addition to starting material.

From this mixture, linalool with the following physical constants:

B.P.$_{10}$ 84–85°; D$_4^{20}$ 0.8615; $n_D^{20}$ 1.462; $[\alpha]_D^{20}$ +14.5° was obtained by fractional distillation.

*Example 2*

100 g. of (+)-cis-pinane-2-ol (M.P. 77–78°) were pyrolysed at a temperature of 600° in the manner described in Example 1. Instead of using a quartz tube as the reaction tube, there was merely employed a smoothly polished tube of stainless steel, which was partially filled with filler bodies of the same material.

In this way, 97.5 g. of pyrolysate could be obtained with a content of 82% of linalool.

The linalool freed by fractional distillation from the other reaction products and unreacted starting material had the following physical constants:

B.P.$_{10}$ 85–86°; $d_4^{20}$ 0.8621; $n_D^{20}$ 1.463; $[\alpha]_D^{20}$ −17.8°

*Example 3*

(−)-cis-pinane-2-ol was reacted, as described in Example 1 or 2, in the presence of 10% of pyridine at a reaction temperature of 600°. According to analysis by gas chromatography, the pyrolysate consisted of 93% of dextrorotatory linalool. The hydrocarbon formation could in this case be reduced to 3%.

*Example 4*

100 g. of (−)-trans-pinane-2-ol (M.P. 58–59°) was isomerised in the presence of 50 g. of pyridine at 630°, as described in Example 2.

After repeatedly washing the reaction products with dilute mineral acid in the cold, there were obtained 98.5 g. of a pyrolysate which, by analysis by gas chromatography, contained no hydrocarbons and consisted of 59% of linalool as well as starting material and other pyroalcohols.

The crude pyrolysate (including pyridine) was subjected to fractional distillation and the physical constants of the pure linalool were determined:

B.P.$_{10}$ 84–86°; $d_4^{20}$ 0.8623; $n_D^{20}$ 1.463; $[\alpha]_D^{20}$ −19.33°

*Example 5*

A mixture of (−)-cis- and (−)-trans-pinane-2-ol in the ratio 2:3, was subjected to pyrolysis in exactly the same way as described in Example 3. After analysis by gas chromatography, the reaction mixture contained 75% of linalool.

The pure linalool isolated by fractional distillation had the following physical constants:

B.P.$_{10}$ 85–86°; $d_4^{20}$ 0.8619; $n_D^{20}$ 1.462; $[\alpha]_D^{20}$ +4.5°

*Example 6*

The practical yield of linalool can be raised by the continuous pyrolysis of for example a mixture of (−)-cis- and (−)-trans-pinane-2-ol according to Example 1. Instead of the distillation bridge, a continuously operating distillation column is connected to the head of the heated reaction tube, the said column running for example parallel to the reaction tube and being so offset towards the bottom end that the pyrolysate can be introduced approximately into the middle of the fractionation column. The fractionation column is so adjusted that all reaction products are distilled off through the column, while the unmodified starting material runs back into the evaporation flask through an overflow arranged at the bottom end of the column.

The continuous conversion of pinane-2-ol is not restricted to the experimental arrangement which is described, but other continuously operating pyrolysis arrangements used commercially may be employed.

In this way, all the starting material could be reacted, linalool being obtained in a yield of 60%.

Instead of a reaction tube made of quartz, a tube made of stainless steel was employed and continuous reactions were carried out in accordance with Examples 2, 3 or 5. In this way, pyrolysates could be obtained with a linalool content of up to 90%.

We claim:

1. A process for the production of linalool which comprises pyrolyzing optically active pinane-2-ol at a temperature of from 500–650° C. under a vacuum of from 100 to 0.5 mm. Hg in the presence of a nitrogen containing base selected from the group consisting of ammonia, pyridine and dimethyl aniline and recovering the pyrolyzate containing linalool thereby formed.

2. A process for the production of linalool which comprises pyrolyzing (+)-trans-pinane-2-ol at a temperature of 500–650° C. under a vacuum of from 100 to 0.5 mm. Hg in the presence of nitrogen containing base selected from the group consisting of ammonia, pyridine, and dimethyl aniline to produce a pyrolyzate-containing linalool.

3. A process for the production of linalool which comprises pyrolyzing (−)-trans-pinane-2-ol at a temperature of 500–650° C. under a vacuum of from 100 to 0.5 mm. Hg in the presence of nitrogen containing base selected from the group consisting of ammonia, pyridine, and dimethyl aniline to produce a pyrolyzate-containing linalool.

4. A process for the production of linalool which comprises pyrolyzing (+)-cis-pinane-2-ol at a temperature of 500–650° C. under a vacuum of from 100 to 0.5 mm. Hg in the presence of a nitrogen containing base selected from the group consisting of ammonia, pyridine and dimethyl aniline to produce a pyrolyzate containing linalool.

5. A process for the production of linalool which comprises pyrolyzing (−)-cis-pinane-2-ol at a temperature of 500–650° C. under a vacuum of from 100 to 0.5 mm. Hg in the presence of a nitrogen containing base selected from the group consisting of ammonia, pyridine and dimethyl aniline to produce a pyrolyzate containing linalool.

6. A process for the production of linalool which comprises pyrolyzing a mixture of (−)-cis and (−)-trans-pinane-2-ol at a temperature of 500–650° C. under a vacuum of from 100 to 0.5 mm. Hg in the presence of a nitrogen containing base selected from the group consisting of ammonia, pyridine and dimethyl aniline to produce a pyrolyzate containing linalool.

7. A process for the production of linalool which comprises pyrolyzing optically active pinane-2-ol in a stainless steel reaction zone heated to a temperature of from 500–650° C. under a vacuum of from 100 to 0.5 mm. Hg in the presence of a nitrogen containing base selected from the group consisting of ammonia, pyridine and dimethyl aniline to produce a pyrolyzate containing linalool.

8. A continuous process for the production of linalool which comprises pyrolyzing optically active pinane-2-ol in a stainless steel reaction zone heated to a temperature of from 500–650° C. under a vacuum of from 100 to 0.5 mm. Hg in the presence of a nitrogen containing base selected from the group consisting of ammonia, pyridine and dimethyl aniline to produce a pyrolyzate containing linalool.

9. Process for the production of linalool which comprises pyrolyzing pinane-2-ol at a temperature of from 500–650° C. under a vacuum of from 100 to 0.5 mm. Hg in the presence of a nitrogen-containing base selected from the group consisting of ammonia, pyridine and dimethyl aniline, and recovering the pyrolyzation product containing linalool hereby formed.

References Cited by the Examiner
UNITED STATES PATENTS

| 2,972,632 | 2/1961 | Bain et al. | 260—631.5 |
| 2,972,633 | 2/1961 | Klein et al. | 260—631.5 |

LEON ZITVER, *Primary Examiner.*

LORRAINE A. WEINBERGER, *Examiner.*